(12) United States Patent
Chen et al.

(10) Patent No.: US 6,457,648 B1
(45) Date of Patent: Oct. 1, 2002

(54) DUAL-INTERFACE CARD READING DEVICE

(75) Inventors: Wen-Hui Chen, Sanchung; Jing-Chang Yang, Hsin Chu; Szu-hung Lin, Taipei, all of (TW)

(73) Assignee: Singular Technology Corporation, Taipei (TW)

( * ) Notice: Subject to any disclaimer, the term of this patent is extended or adjusted under 35 U.S.C. 154(b) by 0 days.

(21) Appl. No.: 09/420,239

(22) Filed: Oct. 19, 1999

(51) Int. Cl.[7] .................................................. G06K 7/00
(52) U.S. Cl. ........................................ 235/486; 235/449
(58) Field of Search ................................. 235/486, 380, 235/449

(56) References Cited

U.S. PATENT DOCUMENTS 5,091,811 A * 2/1992 Chang .......................... 360/2
5,786,587 A * 7/1998 Colgate, Jr. ................. 235/454
5,933,812 A * 8/1999 Meyer et al. ................ 235/380
6,318,916 B1 * 10/2000 Zolkos et al. ............... 235/475

FOREIGN PATENT DOCUMENTS

EP        0959424 A1  *  5/1998

* cited by examiner

Primary Examiner—Mark Tremblay
(74) Attorney, Agent, or Firm—Bacon & Thomas

(57) ABSTRACT

A dual-interface card reading device, having a main body and cover plate assembled to form an opening which accommodates insertion of a magnetic card or an IC card, one side of the opening defining a hollow slide groove to enable swiping of a magnetic card or an IC card. A magnetic head extends into the opening to read the magnetic card, and at one end of the hollow slide groove is an IC card contact interface for reading the IC card. A user can thus simultaneously swipe either type of card at an appropriate interface while achieving the effects of small size, low cost, and convenient operation.

3 Claims, 5 Drawing Sheets

DUAL-INTERFACE CARD READING DEVICE

BACKGROUND OF THE INVENTION

The subject invention relates to a dual-interface card reading device, and particularly one that can identify the data on a magnetic card or an IC card so that the user may swipe either a magnetic card or an IC card in the same device. The structural design of the device is such that the whole unit takes up only a minimum volume, thus achieving the effects of small size, low cost and convenient operation.

With science and technological advancement, our currency of coins and paper money has been replaced by plastic money in the form of credit cards or IC cards. These two cards usually operate on different machines. However, it has previously been proposed to combine the two machines into one unit, as shown in FIGS. 5 and 6, which illustrate a perspective view and a front view of the prior art combined card swiping machines, such as the card reading device disclosed in Public Notice No. 315017 of the Patent Gazette. The drawings clearly illustrate a construction involving a one-way opening. To enable a magnetic card or an IC card to be pushed into the one-way opening, the integral width of the machine must be bigger than the width of the magnetic card or the IC card, and a card discharging mechanism must be installed. As a result the machine becomes quite large and its production cost will be high. Therefore, there is room for improvement for the prior art.

In view of the above drawbacks in the prior art, the subject inventor has devoted research on how to minimize the integral construction and reduce its production cost, and by repeated test production and design, has finally come up with the subject invention of a dual-interface card reading device.

BRIEF DESCRIPTION OF THE INVENTION

The main objective of the subject invention is to provide a dual-interface card reading device having a small size, low cost and convenient operation. This objective is achieved by providing a main body and the cover plate which, after assembly, forms an opening to accommodate the insertion of a magnetic card or an IC card, one side of the opening defining a hollow slide groove to accommodate swiping or insertion of the magnetic card or IC card. A magnetic head is mounted on the cover plate and extends into the opening to read the magnetic card, and an IC card interface is provided on the main body at the end of the hollow slide groove to read the IC card. The magnetic head and IC card contacts extend into the opening from opposite sides, allowing separate reading of magnetic stripe and IC cards, and further allowing a magnetic stripe to be read as a card containing both a magnetic strip and an IC is pushed into the IC reading position.

DETAILED DESCRIPTION OF PREFERRED EMBODIMENT

Figure 1:
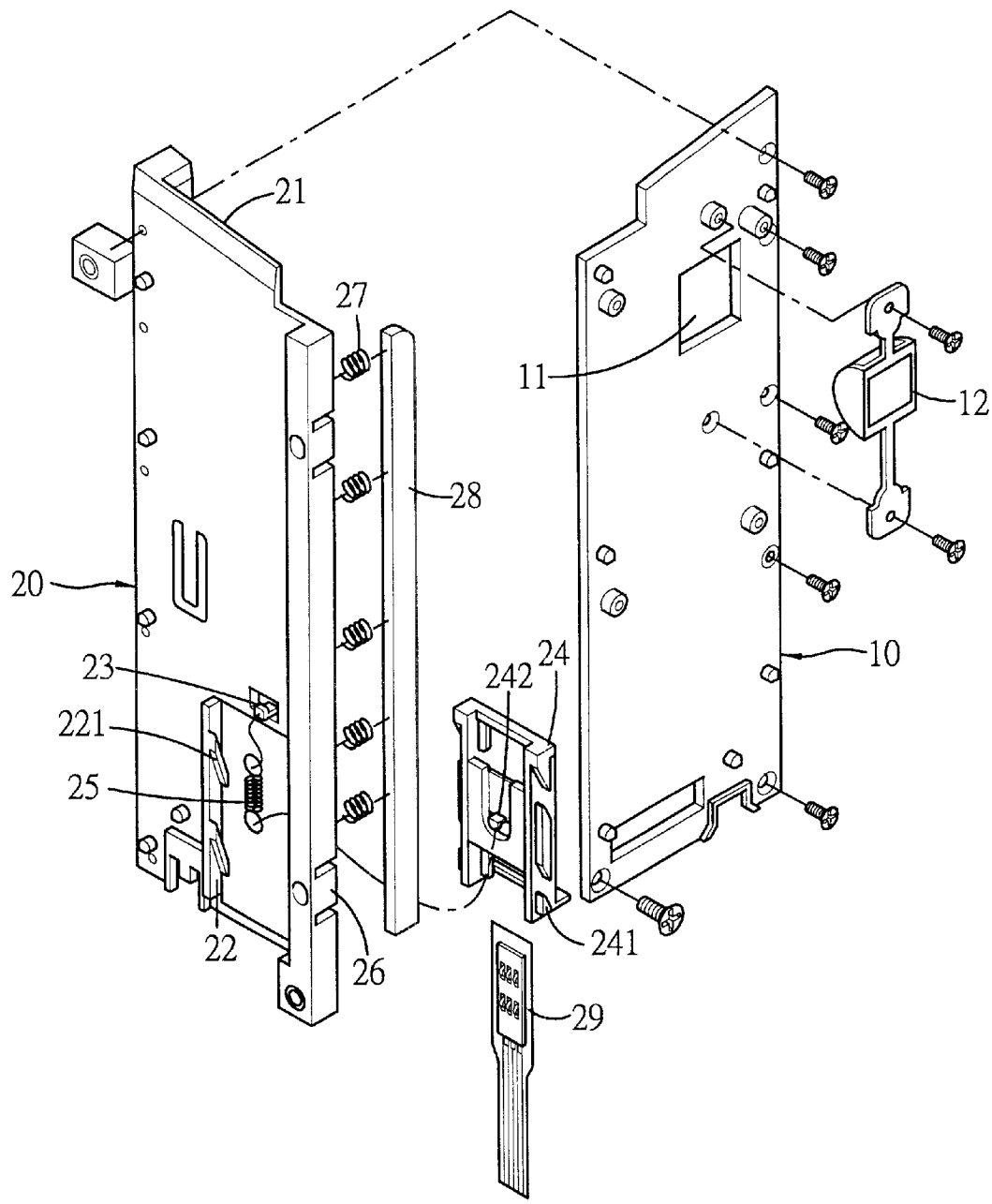
FIG. 1 is an exploded view of the invention.
Figure 2:
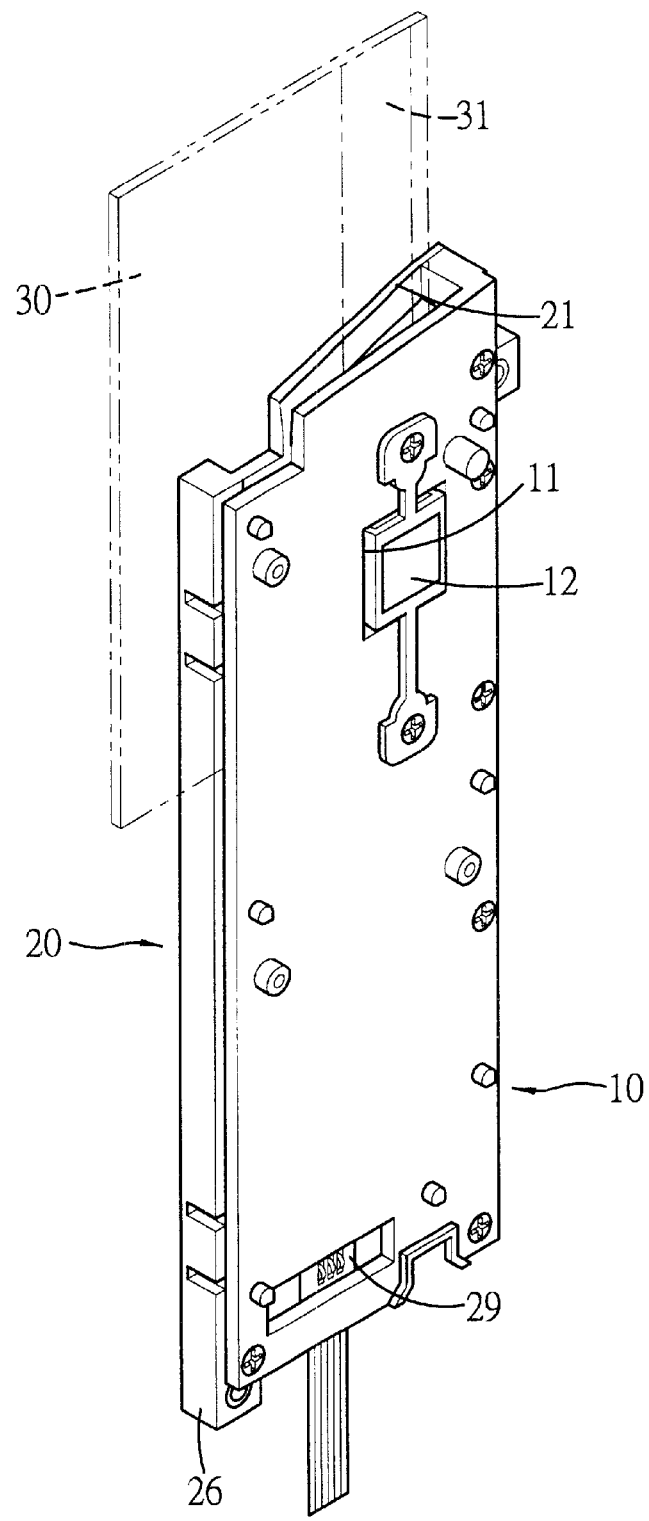
FIG. 2 is a perspective view of the assembled invention with a magnetic card.

Referring to FIGS. 1 and 2, which are an exploded view of the invention and a perspective view of the assembled invention with a magnetic card swiping in it, the subject invention comprises a cover plate 10 and a main body 20, which main components and characteristics are described as follows:

On the upper part of said cover plate 10 is a through hole 11. On one side of the through hole 11 is fixed a magnetic head 12, with a reading side of the magnetic head 12 running through the other side of the through hole 11.

The main body 20 is a folded plate body. At its upper end is an L-shaped opening 21. On the other side of the plate body is a hollow positioning groove 26. In the positioning groove 26 are accommodated springs 27. A mobile plate 28 is fitted to the inlet of the positioning groove 26. On the lower part of the mobile plate is a snap hook 23, to which is secured a first end and a spring 25 for resetting purposes. A second end of the spring 25 is hooked onto a snap hook 242 on a slide plate 24. On two sides of the slide plate 24 is a slide track plate 241 that can be slid between two slide track plates 221 that are complementary to each other on two sides of a slide track unit 22. In the hollow of the slide plate 24 is inserted a contact interface 29 that serves to read a sensing area 41 on an IC card 4.

Figure 3:
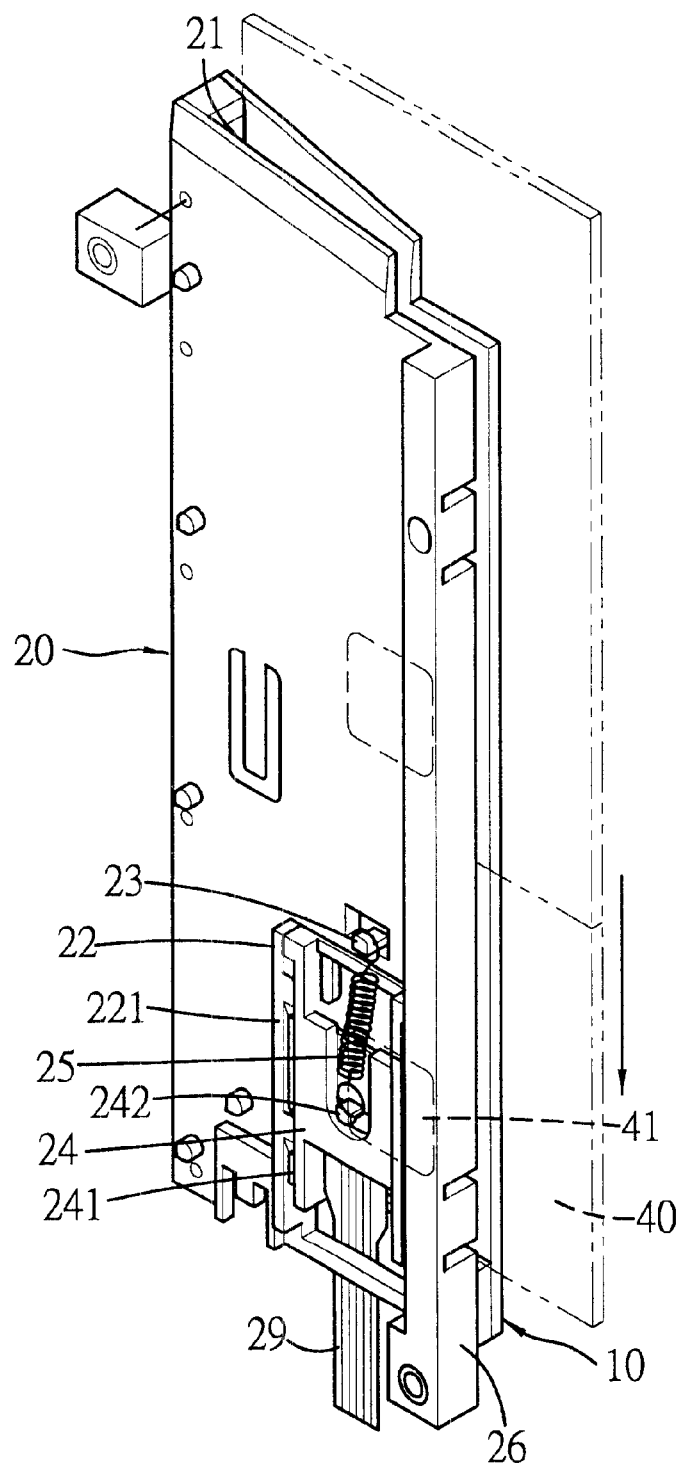
FIG. 3 is a perspective view of the assembled invention with an IC card.
Figure 4:
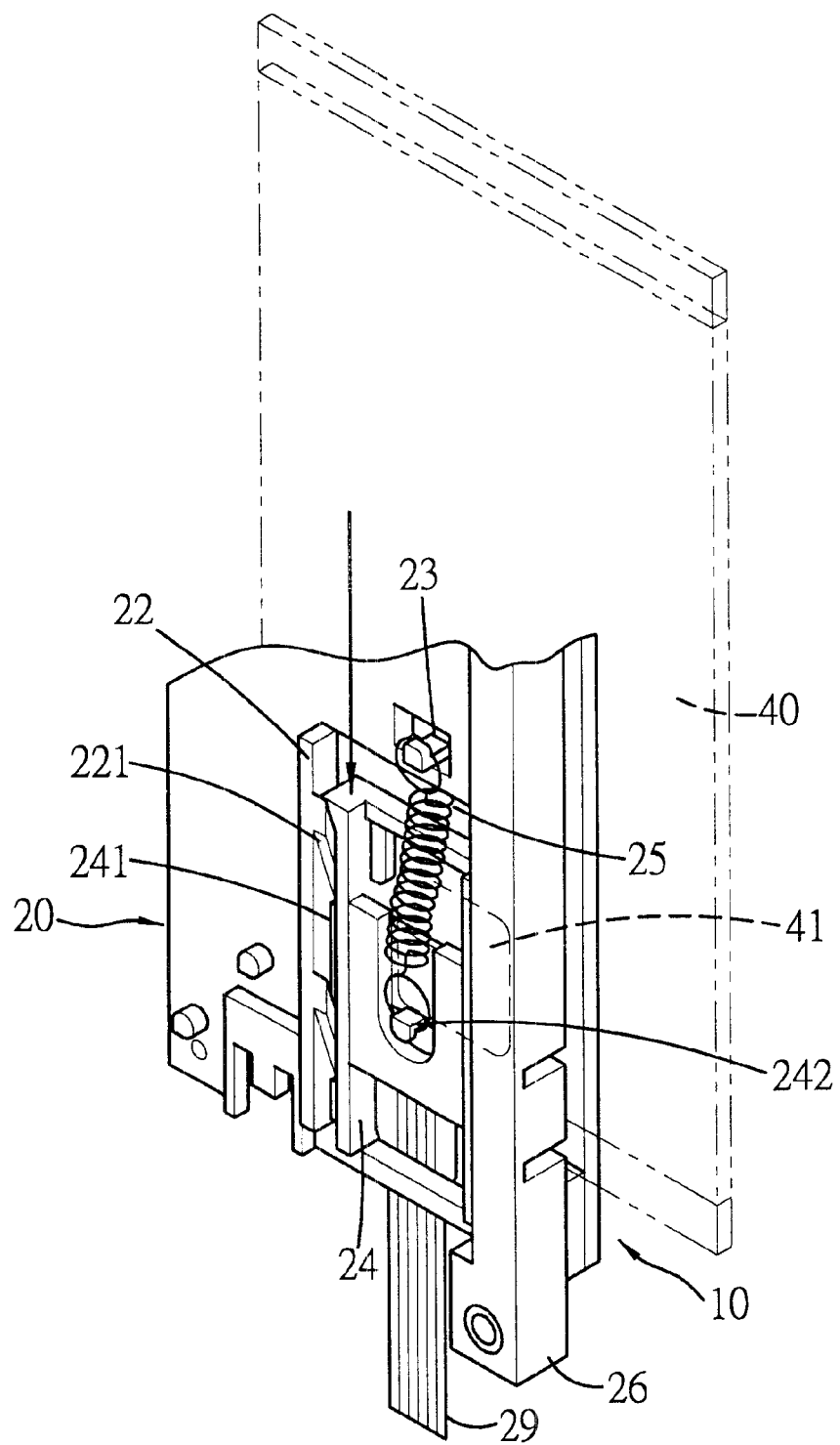
FIG. 4 is a perspective view of a part of the assembled invention with an IC card.
Figure 5:
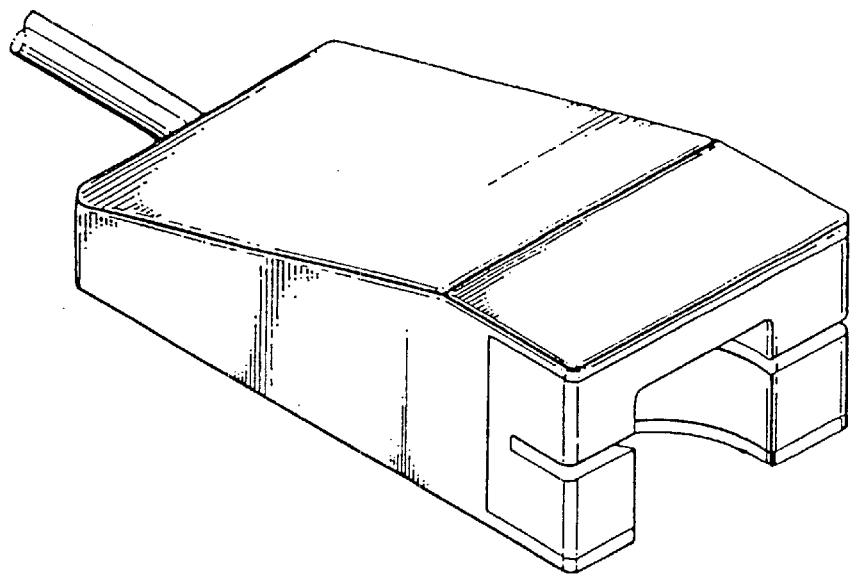
FIG. 5 is a perspective view of the prior art.
Figure 6:
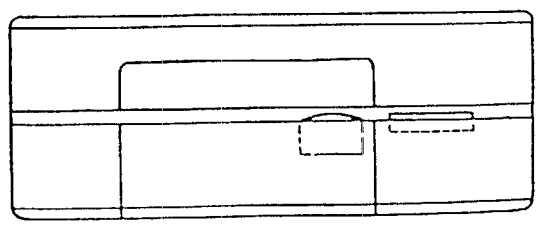
FIG. 6 is a front view of the prior art.

After the cover plate 10 and the main body 20 of the invention are assembled, an inserting hole will be formed by the cover plate 10 and the L-shaped opening 21 on the main body, one side being obstructed by the mobile plate 28 that is extendable in the positioning groove 26. When one end of a magnetic card 3 is inserted, as shown in FIGS. 1 and 2, into the opening 21 on the main body 20, the surface of the magnetic card 3 will push the mobile plate 28 towards the springs 27 in the positioning groove 26, so that the magnetic card 3 slides over the top of the plate. Upon further pushing of the magnetic card 3 into the opening, the sensing area 31 on the magnetic card 3 will pass by the reading side of the magnetic head 12 on the inside of the cover plate 10, and thus the information on the magnetic card 3 can be read. On the other hand, when the invention is applied to an IC card 4, as shown in FIGS. 3 and 4, and the IC card 4 is pushed into the hollow slide groove between the main body 20 and the cover plate 10, the surface of the IC card 4 will push on the mobile plate 28 towards the springs 27 in the positioning groove 26, and when the IC card 4 reaches the end of the groove, the IC card 4 will push the slide plate 24 in the slide track unit 22 of the main body 20. The slide plate will become inclined and push inwardly in known fashion, causing the sensing area 41 of the IC card to touch the contact interface 29 on the inside of the main body 20, and thus the information on the IC card 4 can be read.

As described above, the subject invention involves an improvement on the prior art in that, after the cover plate 10 and the L-shaped opening 21 on the upper part of the main body 20 are assembled, the integral body will have an opening 21 on the top end and a hollow slide groove on the side of the mobile plate 28, so that the volume of the subject invention can be made smaller by one third than that of the prior art which has only a one-way opening, and by enabling a sideways swiping operation, the assembling space for the invention can be reduced, so as to achieve the effects of reduced size, low cost and convenient operation.

What is claimed is:

1. A dual-interface card reading device, comprising:

a main body;

a cover plate assembled to the main body;

a card-receiving opening extending between the main body and the cover plate, said card-receiving opening forming a slide groove dimensioned to accommodate insertion of a magnetic card, an IC card, or a card having both a magnetic stripe and an IC;

a magnetic head mounted on the cover plate and extending into the opening to read a magnetic stripe on the magnetic card; and an IC card contact interface mounted on the main body at an end of the slide groove for exchanging data with an IC on the IC card, wherein when said card having both a magnetic stripe and an IC is inserted into the slide groove, said magnetic head reads said magnetic stripe as the card is pushed toward the end of the groove where said IC card contact interface exchanges data with said IC, and wherein a snap hook is mounted on a lower part of the main body, a first end of a resetting spring is secured to the snap hook, and a second end of the resetting spring is hooked to a slide plate, the slide plate being slidably positioned between sides of a slide track unit mounted on the main body, and the IC card contact interface being mounted on the slide plate for movement together with the slide relative to the main body when an IC card is pushed toward said end of said slide groove and engages said slide plate, said IC card contact interface being further arranged to move toward an IC on the IC card contact interface as the slide plate is pushed toward said end of said slide groove by said IC card.

2. The dual-interface card reading device as recited in claim 1, wherein on an upper part of the cover plate is a through hole and the magnetic head is fixed on the edge of the through hole, so that a reading side of the magnetic head extends through the hole into said opening.

3. The dual-interface card reading device as recited in claim 1, wherein the main body includes a positioning groove that extends along an outer edge of said slide groove, the positioning groove accommodating at least one spring and a mobile plate biased by the spring to extend out of an inlet of the positioning groove to close said slide grove when no card is inserted in said card reader.

* * * * *